(12) United States Patent
She et al.

(10) Patent No.: US 11,119,255 B2
(45) Date of Patent: Sep. 14, 2021

(54) HIGHLY EFFICIENT DATA REPRESENTATION OF DENSE POLYGONAL STRUCTURES

(71) Applicant: PRESIDENT AND FELLOWS OF HARVARD COLLEGE, Cambridge, MA (US)

(72) Inventors: Alan Jenting She, Somerville, MA (US); Shuyan Zhang, Somerville, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 541 days.

(21) Appl. No.: 16/040,363

(22) Filed: Jul. 19, 2018

(65) Prior Publication Data

US 2019/0025477 A1    Jan. 24, 2019

Related U.S. Application Data

(60) Provisional application No. 62/534,661, filed on Jul. 19, 2017.

(51) Int. Cl.
*G02B 5/02* (2006.01)
*G06F 30/17* (2020.01)
*G02B 1/00* (2006.01)
*G02B 27/00* (2006.01)
*G06F 119/18* (2020.01)

(52) U.S. Cl.
CPC ........... *G02B 5/0268* (2013.01); *G02B 1/002* (2013.01); *G02B 27/0012* (2013.01); *G06F 30/17* (2020.01); *G06F 2119/18* (2020.01)

(58) Field of Classification Search
CPC .. G02B 5/0268; G02B 1/002; G02B 27/0012; G06F 30/17; G06F 2119/18
See application file for complete search history.

(56) References Cited

U.S. PATENT DOCUMENTS 10,591,643 B2 *  3/2020  Lin et al. ............... G02B 1/002
10,725,290 B2 *  7/2020  Fan et al. ................ G02B 3/00

OTHER PUBLICATIONS

Nanfang Yu and Federico Capasso; Flat optics with designer metasurfaces; Nature Materials; vol. 13 (Year: 2014).*

(Continued)

*Primary Examiner* — Rehana Perveen
*Assistant Examiner* — Nupur Debnath
(74) *Attorney, Agent, or Firm* — Foley & Lardner LLP

(57) ABSTRACT

A method of generating a layout data file for a metasurface device is disclosed. At a radial position of a metasurface device, the method determines a primitive cell of a first level having a metasurface feature pattern that is repeated around an arc corresponding to a circumference at the radial position. The method generates metasurface structures of higher levels. Each metasurface structure of a higher level includes multiple references to a structure or a primitive cell of a next lower level. The method stores at least a portion of a layout of the metasurface device to a layout data file. The layout includes references to metasurface structures of two or more of the higher levels.

22 Claims, 14 Drawing Sheets

Table 1. Design file size increase according to device diameter and comparison of METAC algorithm

| Device diameter | Element Count | Uncompressed file size | METAC file size |
|---|---|---|---|
| 10 μm | 150 | 19.8 kB | 9.1 kB |
| 50 μm | 3,614 | 157.9 kB | 44.5 kB |
| 100 μm | 14,068 | 501.4 kB | 94.1 kB |
| 500 μm | 1,053,822 | 30.3 MB | 972.1 kB |
| 1 mm | 3,204,089 | 91.2 MB | 1.9 MB |
| 5 mm | 73,194,422 | 2.2 GB | 11.0 MB |
| 10 mm | 291,697,949 | 8.8 GB | 23.3 MB |
| 50 mm | 6,853,721,364 | 205.7 GB | 131.1 MB |

(56) References Cited

OTHER PUBLICATIONS

Alan Zhan, Shane Colburn, Rahul Trivedi, Taylor K. Fryett, Christopher M. Dodson, and Arka Majumdar; Low-Contrast Dielectric Metasurface Optics; ACS Photonics 2016, 3, 209-214 (Year: 2016).*
She, Alan et al., "Large area metalenses: design, characterization, and mass manufacturing", Optics Express vol. 26, No. 2, Jan. 22, 2018, 13 pages.

* cited by examiner

Table 1. Design file size increase according to device diameter and comparison of METAC algorithm

| Device diameter | Element Count | Uncompressed file size | METAC file size |
|---|---|---|---|
| 10 μm | 150 | 19.8 kB | 9.1 kB |
| 50 μm | 3,614 | 157.9 kB | 44.5 kB |
| 100 μm | 14,068 | 501.4 kB | 94.1 kB |
| 500 μm | 1,053,822 | 30.3 MB | 972.1 kB |
| 1 mm | 3,204,089 | 91.2 MB | 1.9 MB |
| 5 mm | 73,194,422 | 2.2 GB | 11.0 MB |
| 10 mm | 291,697,949 | 8.8 GB | 23.3 MB |
| 50 mm | 6,853,721,364 | 205.7 GB | 131.1 MB |

Figure 9

HIGHLY EFFICIENT DATA REPRESENTATION OF DENSE POLYGONAL STRUCTURES

CROSS-REFERENCE TO RELATED APPLICATIONS

This application claims the benefit of and priority to U.S. Provisional Patent Application 62/534,661, filed Jul. 19, 2017, which is incorporated herein by reference in its entirety.

STATEMENT OF FEDERALLY SPONSORED RESEARCH OR DEVELOPMENT

This invention is made with Government support under FA9550-14-1-0389, awarded by Air Force Office of Scientific Research. The Government has certain rights in the invention.

BACKGROUND

Conventional refractive optical components such as prisms and lenses are manufactured by glass polishing. The drawbacks include bulky sizes, high manufacturing costs and limited manufacturing precisions, which prevent the optical components from being used in various applications, particularly portable systems and conformal or wearable devices.

SUMMARY

According to at least some embodiments of the present disclosure, a method of generating a layout data file for a metasurface device is disclosed. At a radial position of a metasurface device, the method determines a primitive cell of a first level having a metasurface feature pattern that is repeated around an arc corresponding to a circumference at the radial position. The method generates metasurface structures of higher levels. Each metasurface structure of a higher level includes multiple references to a structure or a primitive cell of a next lower level. The method stores at least a portion of a layout of the metasurface device to a layout data file. The layout includes references to metasurface structures of two or more of the higher levels.

BRIEF DESCRIPTION OF THE DRAWINGS

For a better understanding of the nature and objects of some embodiments of this disclosure, reference should be made to the following detailed description taken in conjunction with the accompanying drawings.

FIG. 9 illustrates a table showing that how the design file size increases according to device diameter and showing an effectiveness of the disclosed approach for data compression.

DETAILED DESCRIPTION

Figure 1:
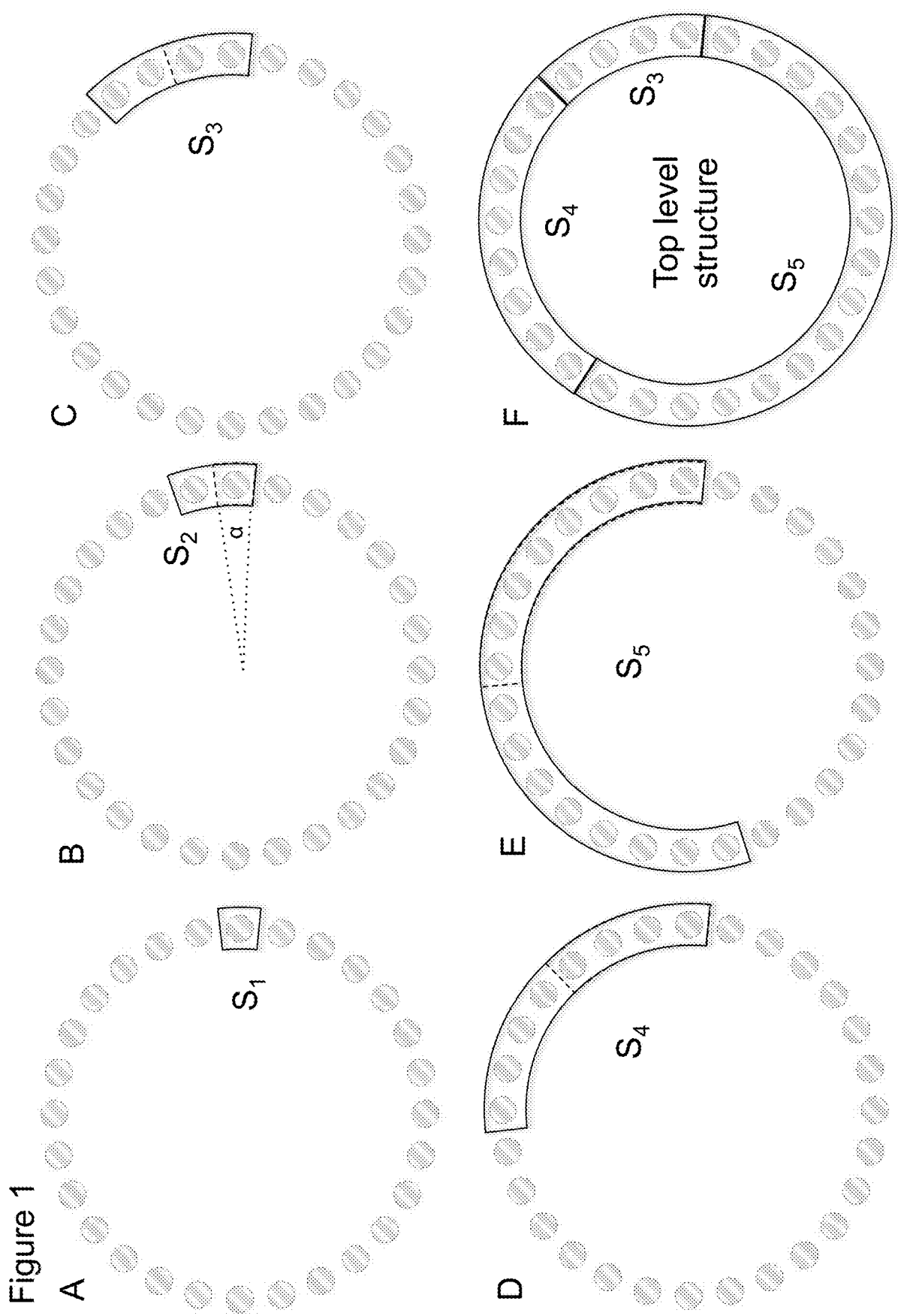
FIG. 1 illustrates an example of data representation of rotationally symmetrically arranged metasurface cells at a specific radial position.

Thin, flat devices such as planar optical elements (POEs) can replace bulky optical devices (e.g., lenses) with the same functionalities. POEs control the wavefront of light by using arrays of features such as fixed optical phase shifters, amplitude modulators, and/or polarization changing elements. The features of POEs are patterned on a surface to introduce a desired spatial distribution of optical phases, amplitudes, and/or polarizations of the light. Through the specific design, the POEs can achieve various functionalities of optical devices. For example, the POEs can manifest functionalities of, e.g., lenses, axicons, blazed gratings, vortex plates, wave plates, or a combination of two or more thereof.

In particular, the POEs can include a class of optical components called metasurfaces. A device includes at least one metasurface is called metasurface device. The metasurfaces are based on small optical elements (also referred to as metasurface elements or metasurface features). The small optical elements may be spaced less than the distance corresponding to a wavelength of light apart. By reducing the spacing of these metasurface elements, diffraction orders (such as those seen in diffraction gratings or convention diffractive optical elements) can be suppressed, thus improving performance, and in particular, efficiency of the metasurface device. The metasurfaces provide a versatile platform for locally modulating the phases, amplitudes, and/or polarizations of an incident wavefront. The metasurfaces may be used in various compact optical elements, e.g., lenses, polarimeters, axicons, holograms, etc.

In general, when the feature size is reduced, the density of structures increases and therefore the data density in a computer-aided design (CAD) used for device fabrication also increases. For example, when considering feature sizes on, e.g., nanometer or micrometer scale over a device area spanning, e.g., multiple millimeters to centimeters or more, the total file size of a CAD with such a high feature density may be so large that it becomes unmanageable in terms of data manipulation, data transfer, and machine readability.

According to at least some embodiments of the present disclosure, a method of representing this data in a highly efficient manner is presented for devices with a degree of rotational symmetry, such that the resulting data file size is reduced by, e.g., many orders of magnitude while maintaining full fidelity of polygonal structures of the original intended design of the metasurface. The disclosed method may be used for design of metasurface with a high rotational symmetry, such as metasurface lenses, with device diameters of, e.g., millimeters, centimeters, meters, or above.

CAD files of metasurface devices can be created and stored in, e.g., database file format for integrated circuit (IC) layout. For example, the database file format can be, e.g., GDSII (Graphic Database System II). The metasurface designs stored in the files can be implemented by lithographic processes such photolithography, electron beam lithography, nano-imprint, etc. For example, a 50-millimeter (mm) metadata device may include over 6 billion elements. Each instance of the element includes nanometer-precision definitions of x, y position as well as the radial size. Since these design files undergo computational processes such as data conversion or fracturing for use with mask writing equipment, it is desirable for the file sizes to be reduced or minimized. The significantly large file size may limit fabrication sizes of the metasurface devices to be no larger than a few millimeters.

According to at least some embodiments of the present disclosure, a compressive algorithmic approach is used for the generation of these design files, which significantly reduce the file size. At least in some embodiments, the approach is referred to as "METAC" (METAsurface Compression). In some embodiments, the approach uses a large number of hierarchical levels in the database design to leverage the rotational symmetry of the metasurface device. In addition, certain conversion software or mask writing machines of fabrication facility may impose a limit on the total number of levels that a design of database file may have. The disclosed approach may further limit the total number of levels. For example, an approach with a limit of 16 levels may be referred to as METAC16.

The METAC approach represents metasurface data efficiently by making references to lower level structures in CAD file formats. For a rotationally symmetric metasurface device, at each radial position, a library of one or more self-referenced structures is generated. The structures within this library are referenced by higher level structures.

FIG. 1 illustrates an example of data representation of rotationally symmetrically arranged metasurface cells at a specific radial position. Each cell may include one or more metasurface features. Part A of FIG. 1 shows S1, which is the structure of the primitive cell in the library set. The primitive cell contains the structure to be copied around the circumference of the radial position. For illustration purpose, the structure in the cell is shown as a circle. The cell structure may have various shapes.

Part B of FIG. 1 shows S2, which is the next higher level structure in the library set, which contains a reference to S1 as well as a duplicate reference to S1 arranged so that the duplicate is adjacent to the first reference to S1. Thus, S2 contains twice as many copies as the lower level structure S1. Part B of FIG. 1 also shows the base copy angle, α, which is the azimuthal angular separation between cells at which the radial position is calculated. Part C of FIG. 1 shows S3, which is the next higher level structure in the library set. S3 contains two references to S2, and thus 4 copies of S1. Similarly, part D of FIG. 1 shows S4, which references S3 twice and contains 8 copies of S1. Part E of FIG. 1 shows S5, which references S4 twice and contains 16 copies of S1. Part F of FIG. 1 shows a top level structure, which generates the complete metasurface device structure by including a number of unique library references at a specific radial position, which includes, e.g., S3, S4, and S5.

Figure 2:
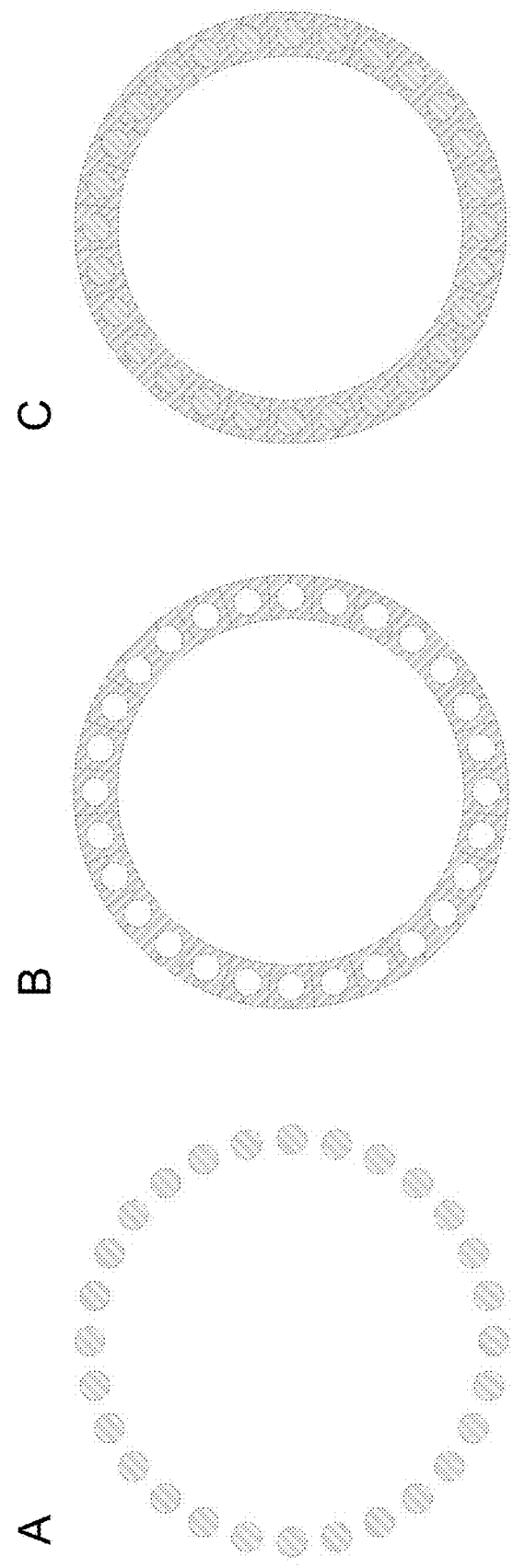
FIG. 2 illustrates metasurface structures with different primitive cell shapes.

The primitive cells may have various shapes. FIG. 2 illustrates metasurface structures with different primitive cell shapes. Part A of FIG. 2 shows primitive cells of circles. Part B of FIG. 2 shows primitive cells of negative patterns of circles. Part C of FIG. 2 shows primitive cells of both circles and their associated negative pattern, which may be in the same cells but in different fabrication layers. In other words, the disclosed approach can define metasurface design of multiple fabrication layers within the same primitive cell, which may further reduce file size.

In other words, the library is generated by starting with a primitive structure, S1, which is intended to be copied along an arc corresponding to the circumference of the radial position. The approach makes a series of exponentially doubled structures with increasing hierarchical levels. The primitive structure may be a structure with one or more layers. For example, the second structure in the library, S2, makes two references of S1: one at its original position and a second rotated about the origin of the device such that it is adjacent to the first reference of S1. The third structure, makes two references to S2, and so on. The top level structure, which contains the structure of the intended device, make references to the library by choosing a minimum number of unique structures from the library to complete at least a portion of the device at that radial position. As described in detail in FIG. 7, this minimum set of unique structures can be found by converting the total number of copies into a binary number (base-2 numeral system), in which each digit with a value of 1 or 0 corresponds to the inclusion or exclusion of each structure in the library corresponding to the digit number. The structures are then placed at the correct angular positions such that the correct structure is produced. The process is then repeated for each and every radial position until the device is completed.

Figure 3:
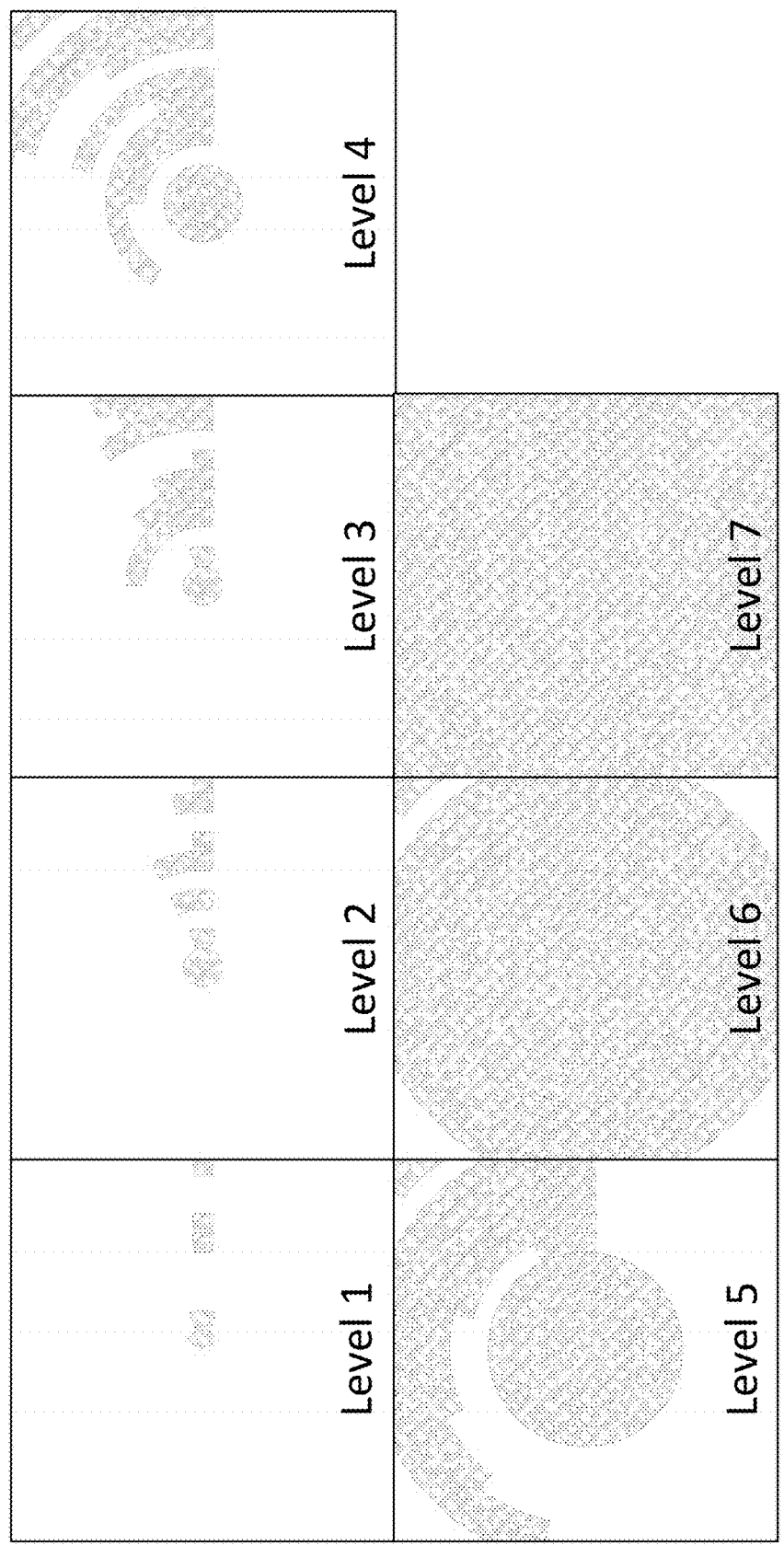
FIG. 3 illustrates a sample design of a metasurface lens.

FIG. 3 illustrates a sample design of a metasurface lens. The approach defines metasurface structures of different levels, wherein higher level structures make references to lower level structures. The approach then generates a design of a metasurface lens by including one or more library references to structures of different levels.

The design of the metasurface lens may include multiple rings. For example, in some embodiments, the annular structure shown in parts F and C of FIG. 1 and FIG. 2 may be the 5th ring (counting form the center) of the metasurface design shown in FIG. 3. The level numbers indicate which of the referenced structures in the library set are shown with at least this number of levels. For example, the 5th ring begins to appear when level 3 is shown, corresponding to the reference to the structure S3 in the library set. Levels 4 and 5 show the completion of the 5th ring, corresponding to structures S4 and S5. In the embodiment illustrated in FIG. 3, 7 levels are used to complete the metasurface device. But in some embodiments, larger devices may use more levels.

Figure 4:
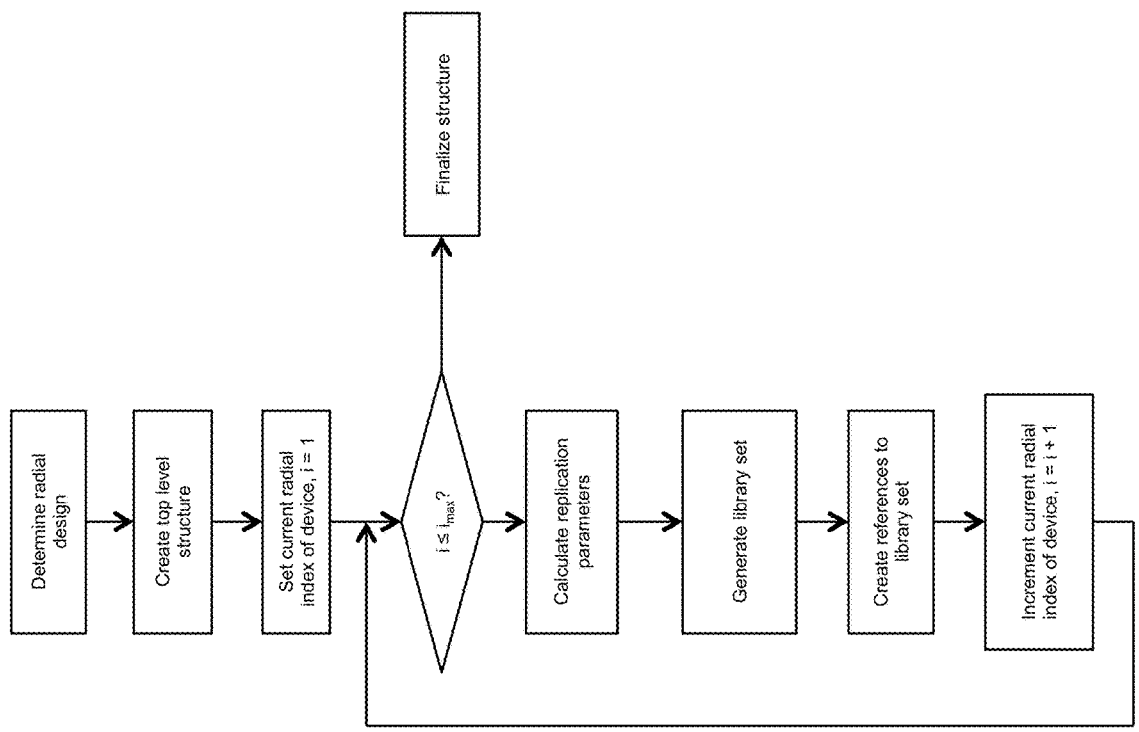
FIG. 4 illustrates a flowchart for generating a metasurface design file.

FIG. 4 illustrates a flowchart for generating a metasurface design file. As shown in FIG. 4, a radial design is determined, in which the geometry of each structure is defined at each radial position. The geometry can be any polygonal or non-polygonal shape, and is not limited to circles. An empty top level structure is created to contain the final device structure. A loop is performed, where the structure at each radial position is efficiently copied around an arc corresponding to the circumference at each radial position. The copy mechanism may include three steps: calculation of replication parameters, generation of the library set, and creation of references to the library set, each of which are described in flowcharts of FIGS. 5, 6, and 7, respectively.

Figure 5:
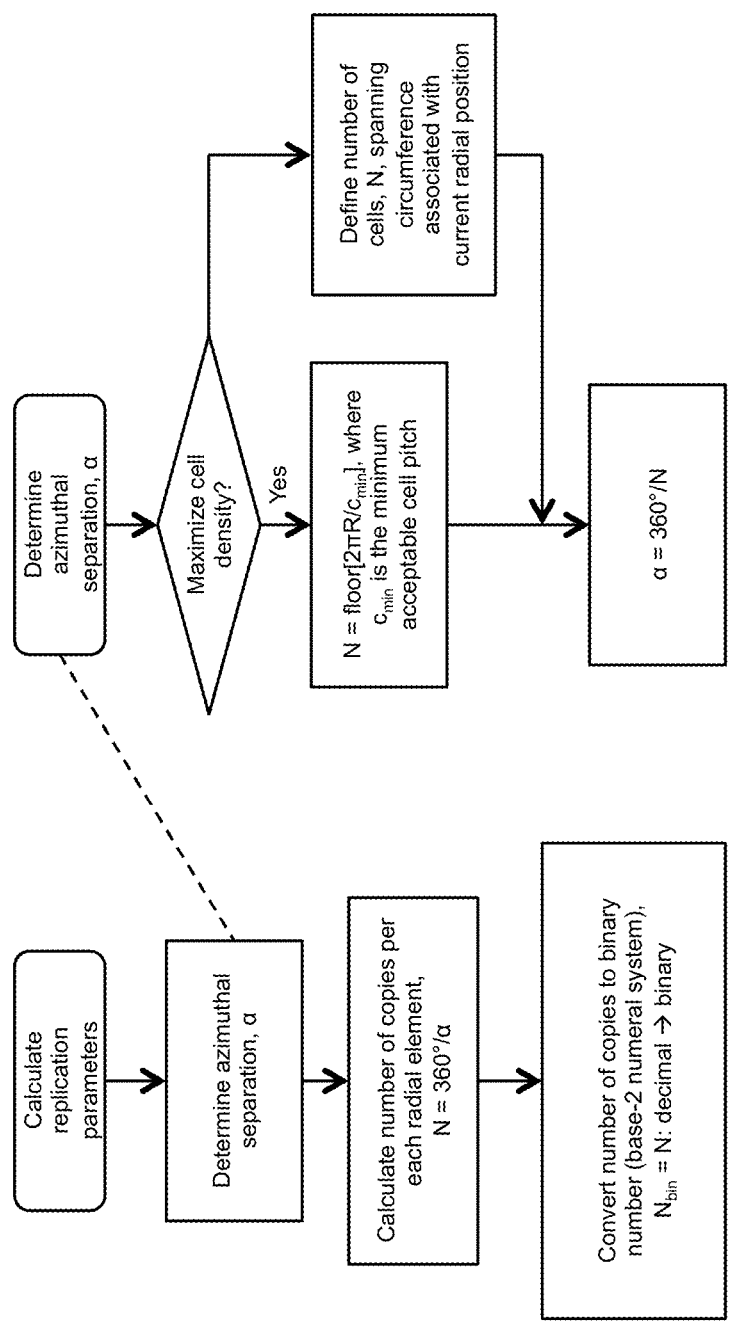
FIG. 5 illustrates a flowchart for calculating replication parameters.
Figure 7:
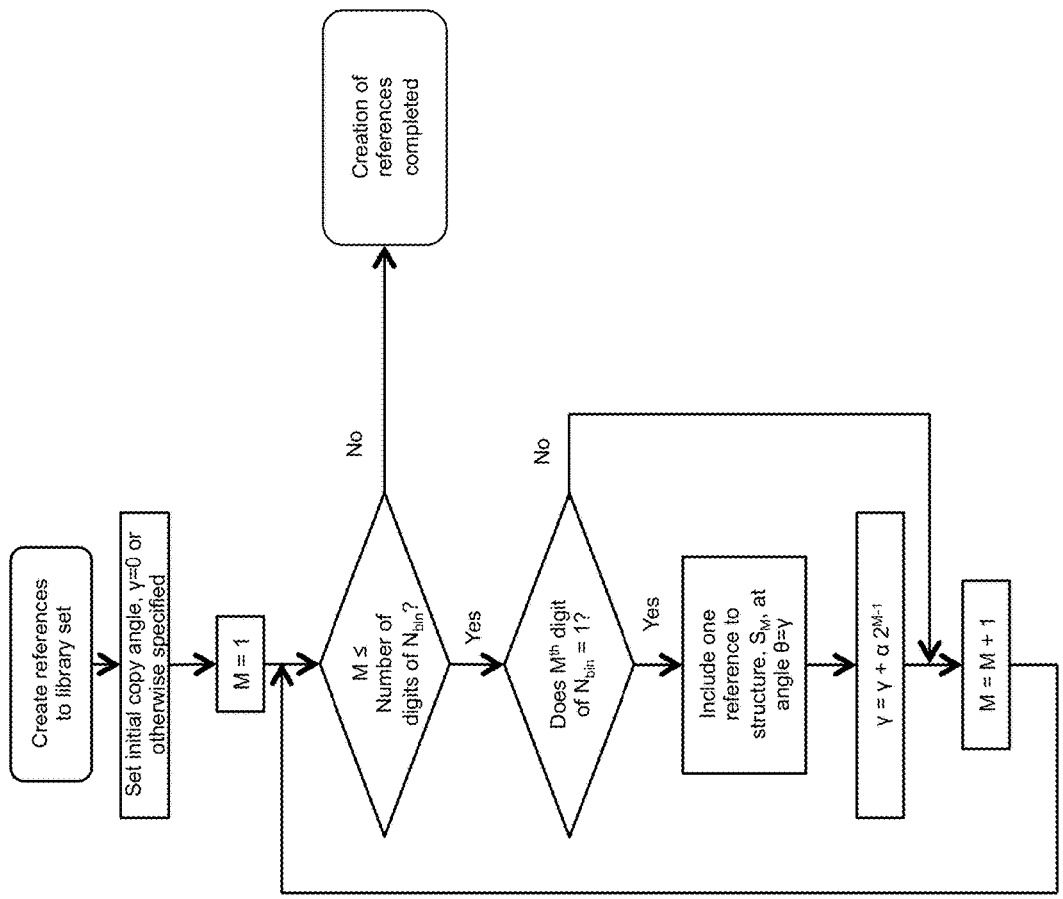
FIG. 7 illustrates a flowchart for creating references to a library set in a top level structure.

FIG. 5 illustrates a flowchart for calculating replication parameters. The azimuthal angular separation between cells at radial positions is calculated, which is also referred to as the base copy angle, a (shown in part B of FIG. 1). The base copy angle can be determined by maximizing the cell density or otherwise defined. Then, a is used to calculate the total number of copies, N, including the original cell, for that radial position. N is converted from a decimal to a binary number, $N_{bin}$, which is used to determine the references to the library set in a later process, which is illustrated in FIG. 7. With that, the calculation of replication parameters is finished for that particular radial position.

Figure 6:
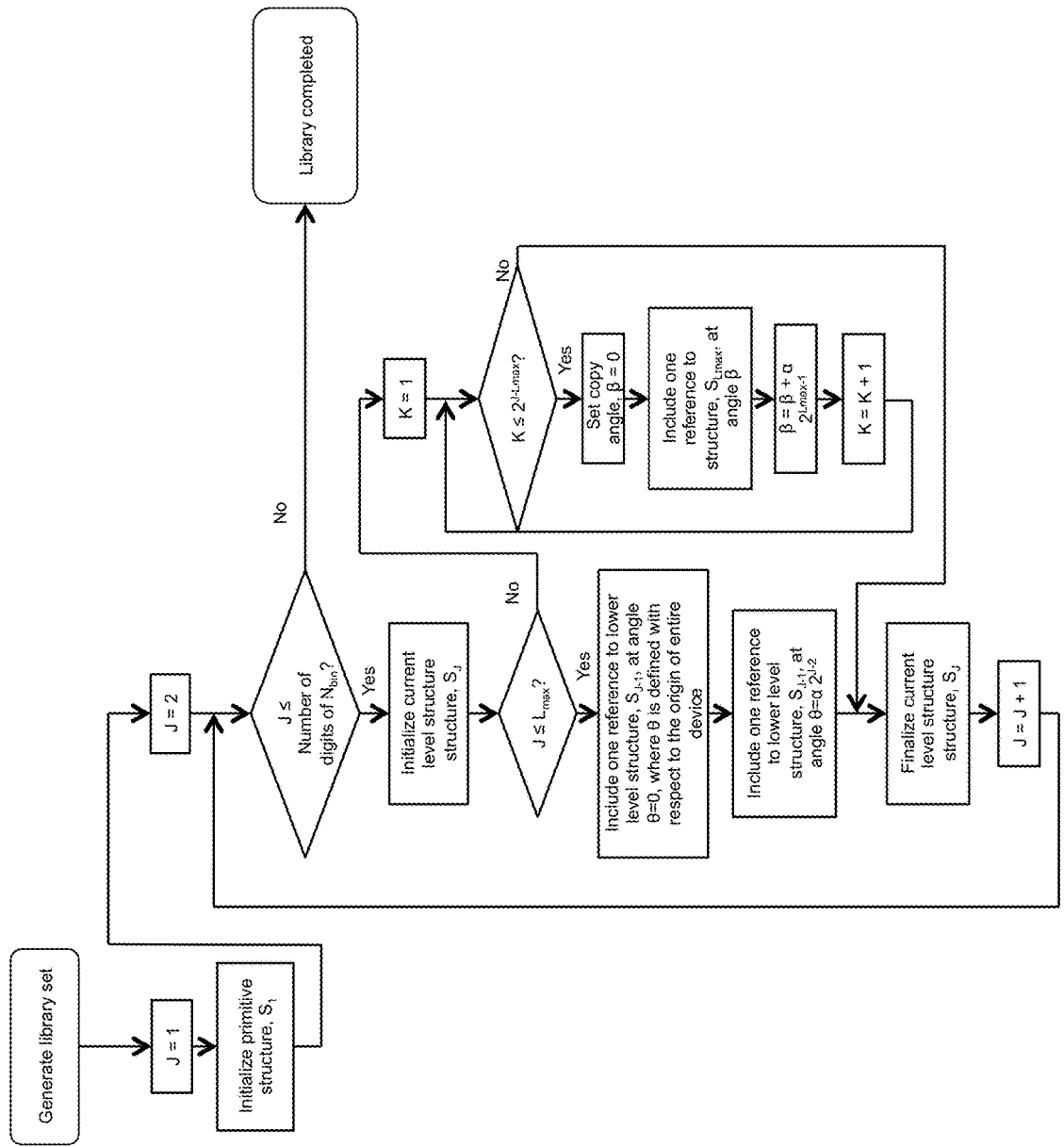
FIG. 6 illustrates a flowchart for generating a library set.

FIG. 6 illustrates a flowchart for generating the library set. The primitive structure, S1, is created, which contains the primitive cell. Then a loop is performed, in which each higher level structure is created. In some embodiments, each higher level structure contains two references to the next lower level. In some other embodiments, each higher level structure contains other numbers of references to the next lower level. If the number of levels exceeds the maximum number of allowed levels, which is defined here as $L_{max}$=maximum number of allowed levels-2, then a subroutine is activated in which a structure is created without exceeding the maximum number of allowed levels (e.g., 2 additional levels are created by this subroutine as well as the top level structure). For examples, if there is a limit of 16 levels, then $L_{max}$=14. In this way, a library set containing exponentially duplicated copies can be represented.

FIG. 7 illustrates a flowchart for creating references to the library set in the top level structure. In some embodiments, to efficiently represent the intended structure using the library set, a minimum number of unique structures in the library set are included. The unique structures from the library set to be used can be determined by the calculated $N_{bin}$. A loop is performed in which each digit of $N_{bin}$ is queried, such that if the digit is equal to 1, then the structure in the library set with the level number corresponding to the same digit number is referenced in the top level structure; and if the digit is equal to 0, then the reference is not made. Each reference is made at the angular position such that it is adjacent to the previous reference, if it is not the first reference. The first reference may be made at any initial angle, γ.

Figure 8:
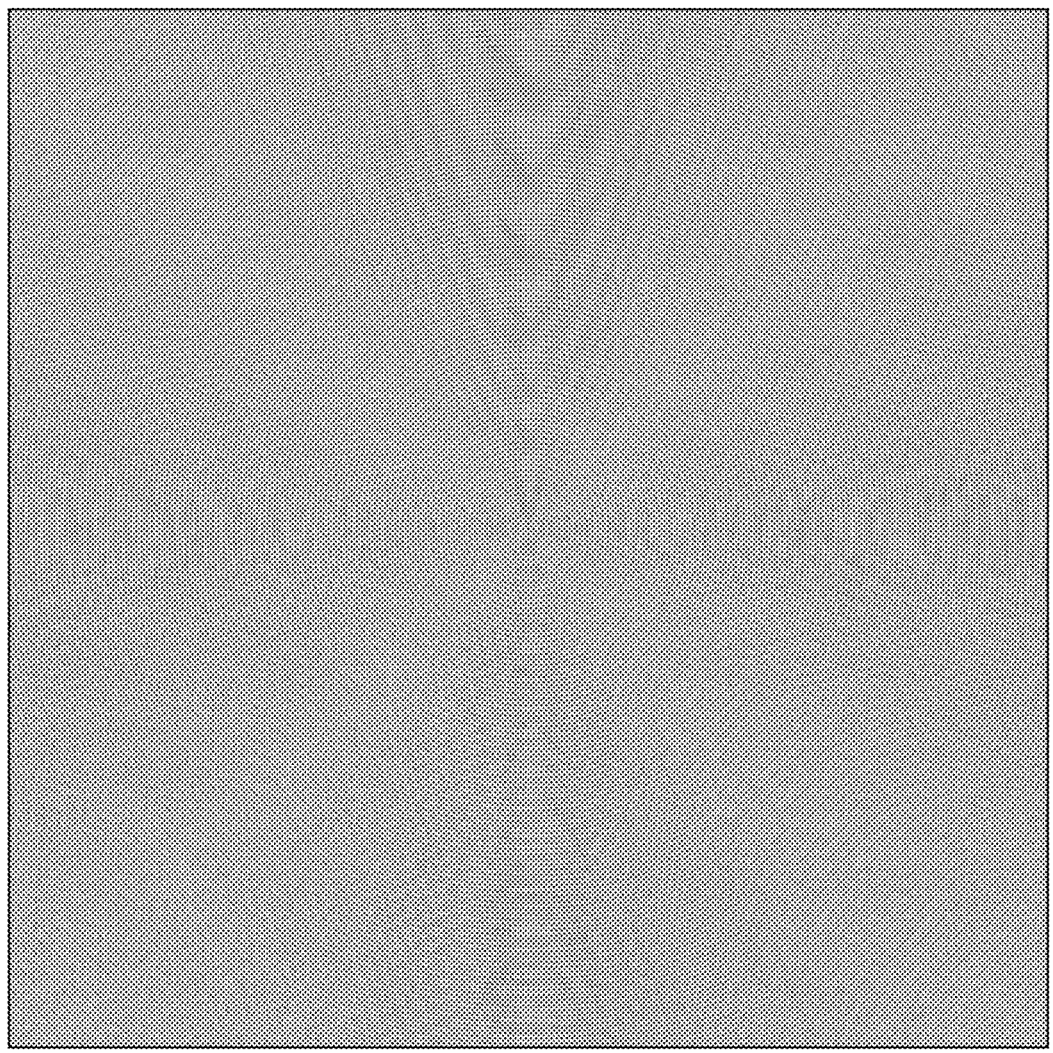
FIG. 8 illustrates an image of an example rotationally symmetric metasurface lens.

FIG. 8 illustrates an image of an example rotationally symmetric metasurface lens. In the metasurface lens, two layers are concurrently shown using different stipple directions, to illustrate the high data density associated with these designs. The two layers correspond to the positive and negative patterns, similarly to the layers illustrated in FIG. 2.

FIG. 9 illustrates a table 1 showing that how the design file size increases according to device diameter and showing an effectiveness of the disclosed approach for data compression. As shown in table 1 of FIG. 9, the element count increases significantly as the device diameter increases. For larger metasurface devices, the METAC file sizes can be several orders of magnitude smaller than the uncompressed file sizes.

Figure 10:
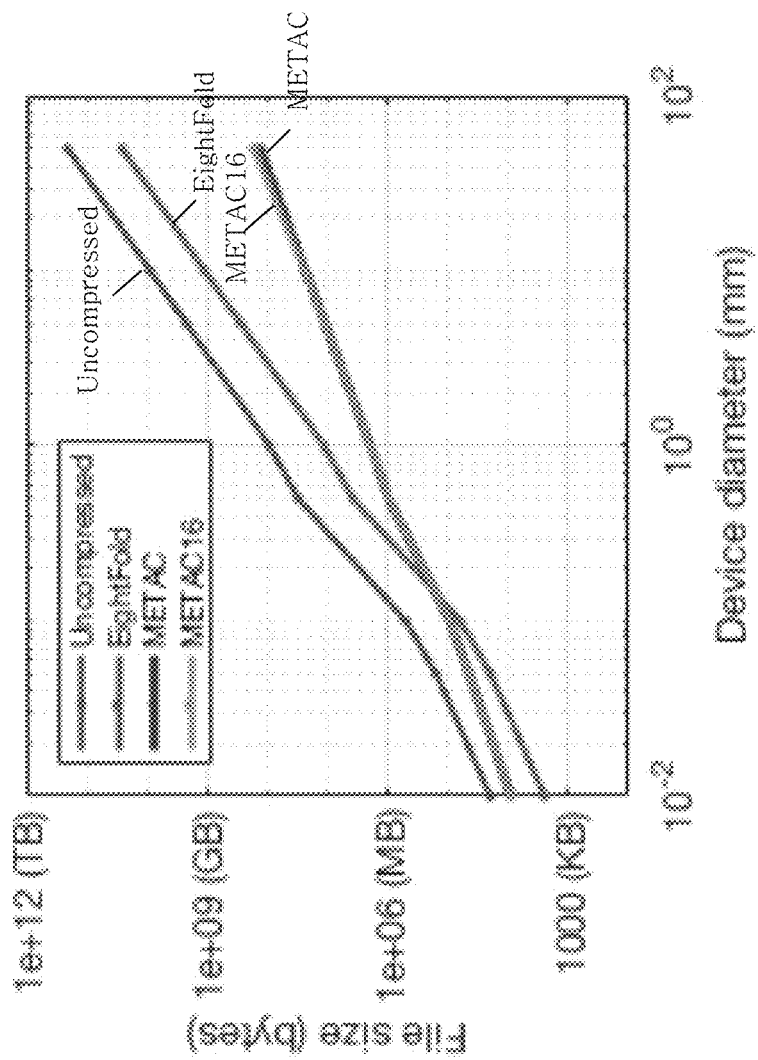
FIG. 10 illustrates a graph showing the analysis of performance in terms of file size vs device diameter.
Figure 11:
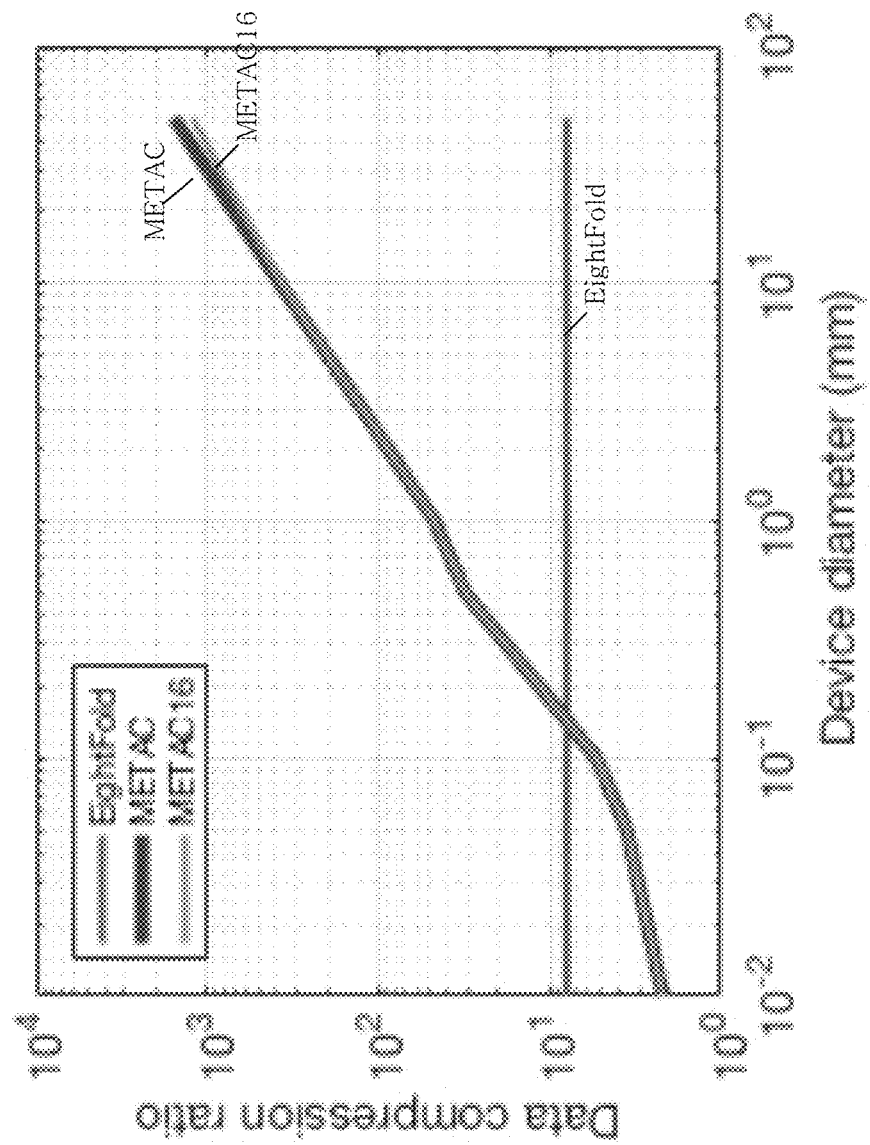
FIG. 11 illustrates a graph showing the analysis of performance in terms of data compression ratio vs device diameter.
Figure 12:
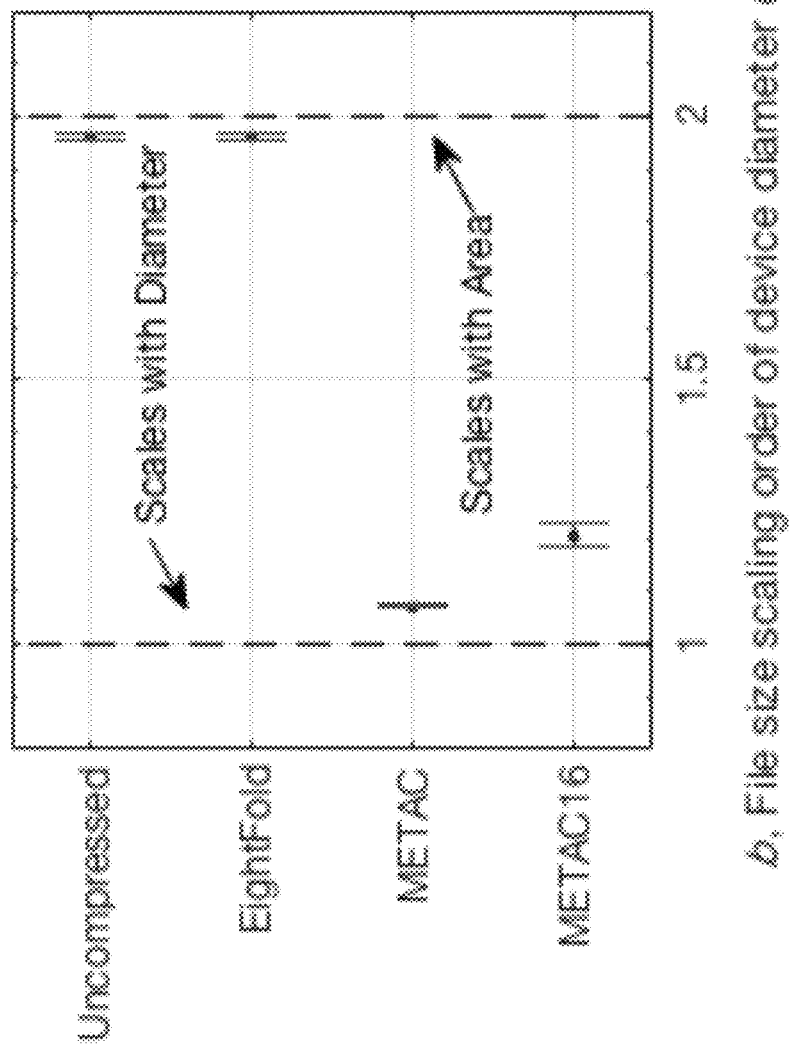
FIG. 12 illustrates a graph showing the analysis of performance in terms of file size scaling orders of the various methods.

FIG. 10 illustrates a graph showing the analysis of performance in terms of file size vs device diameter. FIG. 11 illustrates a graph showing the analysis of performance in terms of data compression ratio vs device diameter. FIG. 12 illustrates a graph showing the analysis of performance in terms of file size scaling orders of the various methods. Four methods were considered: uncompressed, EightFold, METAC, and METAC16. The EightFold method reduces the file size by making eight references to a smaller, unique octant, which is itself uncompressed. The disclosed METAC and METAC16 are significantly better than uncompressed and EightFold in terms of file size, compression ratio, and file size scaling orders.

Figure 13:
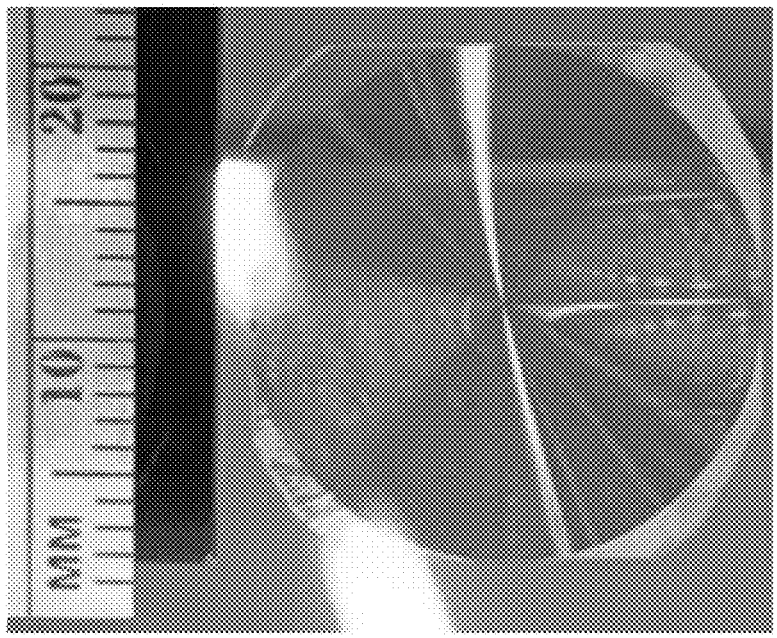
FIG. 13 illustrates a picture of a metasurface lens manufactured based on a database file generated using the disclosed approach.

FIG. 13 illustrates a picture of a metasurface lens manufactured based on a database file generated using the disclosed approach. The metasurface lens has a diameter of 2 centimeters (cm) and is fabricated on a silicon wafer in a single shot photolithography using the database file generated using the disclosed approach. The features (nanostructures) of the metasurface lens are cylindrical posts. There are approximately 2 billion nanostructures on the metasurface lens.

In some embodiments, the disclosed approach represents a design of metasurface device including small polygonal or non-polygonal structures that are replicated around a central axis. The design can be completely rotationally symmetric, or partially rotationally symmetric. The approach can be used to reduce a file size of a CAD file of the metasurface device. In some embodiments, the total number of hierarchical levels used does not exceed a specified maximum number of levels. The duplication base numeral can be 2 or n (3 or greater); in other words, at each level, the approach can make two copies of the structure of a lower level, or n copies.

In some embodiments, the primitive cells and/or structures can have shapes of circles of varying diameters, or any other polygonal or non-polygonal shapes with varying or constant shapes or sizes. The primitive cells and/or structures can include one or more layers. In some embodiments, the approach may be used to compress a portion of the design, instead of the entire design of the metasurface device. The metasurface device may be, e.g., optical devices (such as optical metasurfaces), electrical devices (such as integrated circuits or antennas), acoustic devices, or a combination of two or more thereof. The devices may be made using a lithographic process, such as photolithography, electron beam lithography, or nano-imprint lithography, etc.

In some embodiments, the metasurface device as disclosed may operate in transmission mode and/or reflection mode. The metasurface device may be designed for any suitable wavelength or range of wavelengths in an electromagnetic spectrum. The wavelength range may include, but not limited to, radio spectrum, infrared spectrum, and visible spectrum. The metasurface device may operate for a narrow band a single wavelength, or a broad band or multiple wavelengths. The wavelengths may in the visible, near-infrared, mid-infrared, far-infrared or other spectrums.

In some embodiments, the metasurface device or the POE as disclosed may be designed to accept light with any state of polarization, such as well-defined polarization such as linear, circular or elliptical polarizations, unpolarized light, or partially polarized light. The metasurface device or the POE may or may not perform a separate action on the orthogonal polarization.

In some embodiments, the metasurface device may include a structure that defines any arbitrarily defined spatial pattern. The spatial pattern determines, at each location in the pattern, phase (or geometric phase), amplitude, and/or polarization of the light. The metasurface device may be various optical devices, such as focusing element (lens or axicon), beam deflector (e.g., linear phase gradient), phased array or metasurface, photonic crystal, hologram, diffraction grating, multifocal diffractive lens, polarizer, beam splitter (polarizing or non-polarizing), depolarizer, diffuser, optical attenuator (e.g., neutral density filter, bandpass filter, edge-pass filter), Fabry-Perot resonator, retroreflector, wave plate or retarder (e.g., array of birefringent elements comprising a phase plate), Fresnel zone plate (e.g., a Fresnel imager or Fresnel zone antenna), aperture (e.g., pinhole, iris, diaphragm, or pupil), or a combination of two or more thereof.

In some embodiments, the metasurface device may be used in various applications. For example, the metasurface device may be used in electrically-tunable lenses. The electrically-tunable lenses include, e.g., corrective lenses (e.g., eyeglasses, or contact lenses), magnifiers (e.g., magnifying glass, microscopes, beam expander), photographic lenses (e.g., varifocal lens, zoom lens, fisheye lens, anamorphic lens, mirror lens such as catadioptric lens or reflex lens, corrector plates, full aperture correctors, sub-aperture correctors, aberration correctors, perspective control lens, lenses used to introduce optical special effects such as soft focus lens, stereoscopic lens, projection lens (such as lenses used in image or video projection, photographic reduction or photolithography), or a combination of two or more thereof.

In some embodiment, the metasurface device may be used as being stacked in configurations with multiple electronically tunable flat lenses. For example, the focal lengths of all the stacked lenses may be tuned, or some lenses are tuned and some are not tuned. Some lenses may be tunable and some lenses may not be tunable. The distance of separation between lenses may be fixed or variable by, e.g. action of an ultrasonic motor (e.g., piezoelectric motor, stepper motor, or other linear motors). The effective variable focus of the lens may be enhanced by the multiple-lens configuration. In some embodiments, a parfocal lens may be constructed, for which the focal plane is unchanged while the magnification is changed. In other words, the lens may be an ideal zoom lens, or independent and/or separate control over focus and magnification may be maintained. The independent and/or separate control over focus and magnification may operate in conjunction so that final aberrations are reduced, such as spherical aberration, chromatic aberration, and coma.

In some embodiments, the metasurface device may be used in conjunction with conventional bulky lenses or mirrors as part of a compound lens optical system.

In some embodiments, the metasurface device may be used in an imaging system. For example, the focusing mechanism may be implemented through electrical control. The control may be a manual focusing mechanism such as a wheel, button, screw, switch, slider, or computer control etc. that allows for manual tuning of the voltage and hence the focal length. The control may be an electrical feedback mechanism that adjusts the voltage across the lens and hence the focal length in order to perform autofocusing. The autofocusing may be achieved by, e.g., measuring the distance from the imaging system to the object by means of sound waves (e.g. ultrasonic) or light (e.g. infrared), phase detection by closed-loop control or open-loop control, contrast detection, assist lamp (e.g. an autofocus illuminator) to provide extra light in performing phase detection or contrast detection, or a combination of two or more thereof. The control may be a hybrid autofocus system in which autofocus is achieved by a combination of autofocus mechanisms. The control may be a control system to perform trap focus (e.g., focus trap or catch-in-focus) in which the action of a subject moving into the focal plane activates the acquisition of an image. The control may be a control system that maintains focus on a subject of interest (e.g., focus tracking) by adjusting the voltage and hence the focus in accordance with the distance or appearance of the subject. In some embodiment, in the imaging system, the focus or focal plane is scanned across multiple lengths in a continuous or discrete manner. A confocal microscope configuration may be used in the imaging system to perform, e.g., three-dimensional imaging.

In some embodiments, the metasurface device may be used in communications. For example, the metasurface device may be used in a way that the degree of defocusing or power transmitted is used to encode information.

In some embodiments, the metasurface device may be used in electrically-tunable optical systems. Such electrically-tunable optical systems may include, e.g., catoptric (e.g., reflection-based) systems, Dioptric (e.g., transmission-based) systems, catadioptric (e.g., hybrid reflection and transmission based) systems, photographic cameras, cell phone cameras, video cameras, searchlights, headlamps, optical telescopes, microscopes, telephoto lens, microlens array, head-mounted optics systems, or combination of two or more thereof.

In some embodiments, the metasurface device may be used in other electrically-tunable optical devices and systems. Such electrically-tunable optical devices and systems may include, e.g., fiber coupler, variable coupler, mode converter, collimator, optical modulator, optical phase shifter, polarization state generator, polarimeter, ellipsometer, spectrometer, interferometer, optical chopper, fast change optical filters, optical tweezer, phase compensation, adaptive optics, noise eater or laser amplitude stabilizer, vortex plates for generating light beams with orbital angular momentum, Q plates generating orbital angular momentum of light (OAM), optical power concentrator, optical disc drive, or a combination of two or more thereof.

In some embodiments, the metasurface device may be used in applications including, but not limited to, e.g., image sensors, cameras, endoscopes, machine vision applications, phased arrays, lasers, lenslet arrays, lithotripsy, medical imaging, dichroic filters and/or mirrors, or a combination or two or more thereof.

In some embodiments, other than POEs, the metasurface device as disclosed may be analogously designed as planar acoustic elements (PAEs), such as by the use of acoustic metamaterials, in order to shape the wavefront of acoustic waves, such as ultrasonic waves.

Figure 14:
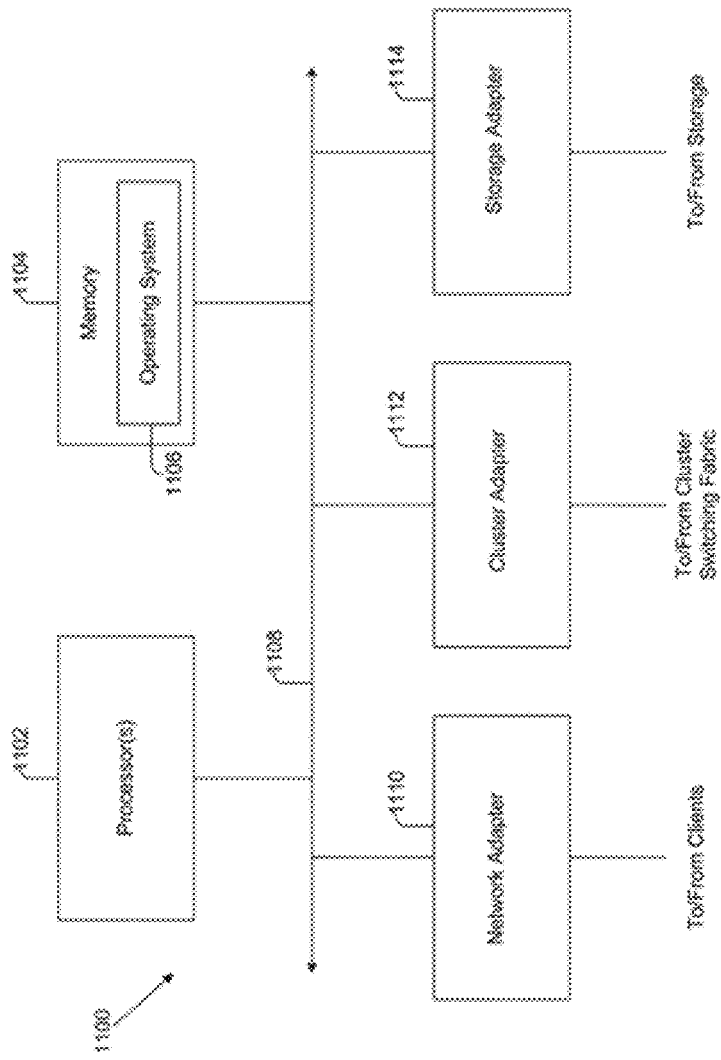
FIG. 14 is a high-level block diagram illustrating an example of a hardware architecture of a computing device that may perform various processes as disclosed.

FIG. 14 is a high-level block diagram illustrating an example of a hardware architecture of a computing device 1100 that may perform various processes as disclosed, according various embodiments of the present disclosure. The computing device 1100 may execute some or all of the processor executable process steps described herein. In various embodiments, the computing device 1100 includes a processor subsystem that includes one or more processors 1102. Processor 1102 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1100 can further include a memory 1104, a network adapter 1110, a cluster access adapter 1112 and a storage adapter 1114, all interconnected by an interconnect 1108. Interconnect 1108 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 1112 includes one or more ports adapted to couple the computing device 1100 to other devices. In the illustrated embodiment, Ethernet can be used as the clustering protocol and interconnect media, although other types of protocols and interconnects may be utilized within the cluster architecture described herein.

The computing device 1100 can be embodied as a single- or multi-processor storage system executing a storage operating system 1106 that can implement a high-level module, e.g., a storage manager, to logically organize the information as a hierarchical structure of named directories and files at the storage devices. The computing device 1100 can further include graphical processing unit(s) for graphical processing tasks or processing non-graphical tasks in parallel.

The memory 1104 can comprise storage locations that are addressable by the processor(s) 1102 and adapters 1110, 1112, and 1114 for storing processor executable code and data structures. The processor 1102 and adapters 1110, 1112, and 1114 may, in turn, comprise processing elements and/or logic circuitry configured to execute the software code and manipulate the data structures. The operating system 1106, portions of which is typically resident in memory and executed by the processors(s) 1102, functionally organizes the computing device 1100 by (among other things) configuring the processor(s) 1102 to invoke. It will be apparent to those skilled in the art that other processing and memory implementations, including various computer readable storage media, may be used for storing and executing program instructions pertaining to the disclosed technology.

The network adapter 1110 can include multiple ports to couple the computing device 1100 to one or more clients over point-to-point links, wide area networks, virtual private networks implemented over a public network (e.g., the Internet) or a shared local area network. The network adapter 1110 thus can include the mechanical, electrical and signaling circuitry included to connect the computing device 1100 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 1114 can cooperate with the storage operating system 1106 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 1114 can include multiple ports having input/output (I/O) interface circuitry that couples to the disks over an I/O interconnect arrangement, e.g., a conventional high-performance, Fibre Channel (FC) link topology. In various embodiments, the cluster adapter 1112 and the storage adapter 1114 can be implemented as one adaptor configured to connect to a switching fabric, e.g., a storage network switch, in order to communicate with other devices and the mass storage devices.

It is to be understood that the term "design" or "designed" (e.g., as used in "design wavelength," "design focal length" or other similar phrases disclosed herein) refers to parameters set during a design phase; which parameters after fabrication may have an associated tolerance.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method of compressing a layout data file for a metasurface device, comprising:

identifying, from the layout data file, a metasurface feature pattern that is repeated around an arc corresponding to a circumference at a radial position of the metasurface device, the layout data file having a first file size and representing the metasurface device;

generating, according to the layout data file based at least in part on the identified metasurface feature pattern, metasurface structures of higher levels, each metasurface structure of a higher level including multiple references to a metasurface structure or a primitive cell of a next lower level;

generating, according to the metasurface structures of higher levels, a compressed layout data file representing at least a portion of a layout of the metasurface device, the layout including references to metasurface structures of two or more of the higher levels, wherein the compressed layout data file has a second file size that is less than the first file size; and fabricating the metasurface device according to the compressed layout data file using a lithographic process.

2. The method of claim 1, wherein the multiple references of the metasurface structure of the higher level are separated by a base copy angle, which is an azimuthal angular separation angle at the radial position.

3. The method of claim 1, further comprising:
selecting a next radial position of the metasurface device; and
repeating, for the next radial position, the generating of the metasurface structures of higher levels, and the generating of the compressed layout data file.

4. The method of claim 1, wherein the metasurface feature pattern has a circular or polygonal shape.

5. The method of claim 1, wherein the layout of the metasurface device is completely rotationally symmetric or at least partially rotationally symmetric.

6. The method of claim 1, further comprising:
specifying a number of levels of the layout to a predetermined number.

7. The method of claim 1, wherein the metasurface feature pattern includes metasurface features of one or more fabrication layers.

8. The method of claim 1, wherein the metasurface device is an optical device, an electrical device, or an acoustic device.

9. The method of claim 1, wherein the layout data file includes a copy of data of the metasurface feature pattern and multiple references to the metasurface feature pattern.

10. A method of manufacturing a metasurface device, comprising:
identifying, from a layout data file, a metasurface feature pattern that is repeated around an arc corresponding to a circumference at a radial position of the metasurface device, the layout data file having a first file size and representing the metasurface device;
generating, according to the layout data file based at least in part on the identified metasurface feature pattern, metasurface structures of higher levels, each metasurface structure of a higher level including multiple references to a metasurface structure or a primitive cell of a next lower level;
generating, according to the metasurface structures of higher levels, a compressed layout data file representing at least a portion of a layout of the metasurface device, the layout including references to metasurface structures of two or more of the higher levels, wherein the compressed layout data file has a second file size that is less than the first file size; and
fabricating the metasurface device according to the compressed layout data file.

11. The method of claim 10, wherein the layout data file includes a library of unique metasurface structures and references to the unique metasurface structures.

12. The method of claim 10, wherein the layout includes metasurface structures of higher levels that make references to metasurface structures of lower levels.

13. The method of claim 10, wherein the layout of the metasurface device includes a plurality of rings.

14. The method of claim 10, wherein adjacent references of the metasurface structure of the higher level are separated by a base copy angle, which is an azimuthal angular separation angle at the radial position.

15. The method of claim 10, further comprising:
selecting a next radial position of the metasurface device; and
repeating, for the next radial position, the generating of the metasurface structures of higher levels, and the generating of at least a portion of the layout.

16. The method of claim 10, wherein the metasurface feature pattern has a circular or polygonal shape.

17. The method of claim 10, wherein the layout of the metasurface device is rotationally symmetric or at least partially rotationally symmetric.

18. The method of claim 10, further comprising:
specifying a number of levels of the layout to a predetermined number.

19. The method of claim 10, wherein the metasurface feature pattern includes metasurface features of one or more fabrication layers.

20. The method of claim 10, wherein the metasurface device is an optical device, an electrical device, or an acoustic device.

21. The method of claim 10, further comprising:
fabricating the metasurface device based on the layout data file using a lithographic process.

22. The method of claim 1, further comprising:
generating a primitive cell of a first level representing the identified metasurface feature pattern, and wherein generating the compressed layout data file includes generating the compressed layout data file according to the primitive cell and the metasurface structures of higher levels.

* * * * *